United States Patent
Curtin

(10) Patent No.: US 6,469,478 B1
(45) Date of Patent: Oct. 22, 2002

(54) MULTIPLE OUTPUT POWER SUPPLY INCLUDING ONE REGULATED CONVERTER AND AT LEAST ONE SEMI-REGULATED CONVERTER

(75) Inventor: John C. Curtin, Cork (IE)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/840,581

(22) Filed: Apr. 23, 2001

(51) Int. Cl.[7] .............................................. G05F 1/618
(52) U.S. Cl. ...................................... 323/266; 323/274
(58) Field of Search .................................. 323/266, 272, 323/282, 284, 285, 274; 363/131, 132, 127, 16; 307/33, 11

(56) References Cited

U.S. PATENT DOCUMENTS

| | | | | |
|---|---|---|---|---|
| 4,355,277 A | * | 10/1982 | Davis et al. ................. | 323/351 |
| 4,459,539 A | * | 7/1984 | Cordy, Jr. .................... | 323/299 |
| 4,713,740 A | * | 12/1987 | Drabing ........................ | 363/17 |
| 4,745,538 A | * | 5/1988 | Cross et al. .................... | 363/25 |
| 4,794,508 A | | 12/1988 | Carroll | |
| 4,860,185 A | * | 8/1989 | Brewer et al. ................ | 363/41 |
| 5,170,333 A | * | 12/1992 | Niwayama .................. | 323/222 |
| 5,490,055 A | * | 2/1996 | Boylan et al. ................ | 363/41 |
| 5,703,473 A | | 12/1997 | Phillips et al. | |
| 6,055,167 A | * | 4/2000 | Shamkovich et al. ......... | 363/52 |
| 6,078,170 A | | 6/2000 | Sudo | |
| 6,232,752 B1 | * | 5/2001 | Bissell ........................ | 323/225 |

OTHER PUBLICATIONS

Unitrode Corporation, *Unitrode Economy Primary Side Controller*, Merrimack, NH, SLUS166A—Nov., 1999.

* cited by examiner

*Primary Examiner*—Rajnikant B. Patel
(74) *Attorney, Agent, or Firm*—Kirkpatrick & Lockhart LLP

(57) ABSTRACT

A power supply, including a regulated switchmode converter, a PWM controller, a semi-regulated converter, and a linear regulator. The regulated switchmode converter is for converting an input voltage to a first output voltage. The PWM controller is responsive to the first output voltage, and includes an output terminal coupled to a control terminal of a switch of the regulated switchmode converter. The semi-regulated switchmode converter is for converting the input voltage to an intermediate output voltage, and includes a switch having a control terminal coupled to the output terminal of the PWM controller. The linear regulator is coupled to the semi-regulated switchmode converter and is for converting the intermediate output voltage to a second output voltage.

28 Claims, 6 Drawing Sheets

MULTIPLE OUTPUT POWER SUPPLY INCLUDING ONE REGULATED CONVERTER AND AT LEAST ONE SEMI-REGULATED CONVERTER

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to power conversion and, more particularly, to a multiple output power supply including one main output and at least one other output derived from the same switching source.

2. Description of the Background

With the exception of the most simple battery powered devices, all electronic equipment requires some sort of power conversion. Electronic circuitry typically operates from DC voltage sources while the input power to the system is typically in the form of AC power. Furthermore, the end circuitry design of the system is typically optimized to operate from specific levels of DC voltage. Thus, the input power must be converted to specifically required DC voltages.

There are two basic methodologies for accomplishing regulated power conversion. The first is called "linear regulation" because the regulation characteristic is achieved with one or more semiconductor devices operating in the linear region. Linear regulators provide the advantages of simplicity, low output noise, fast response times, and excellent regulation. They may, however, be unacceptably inefficient in certain applications.

The second methodology is called "switchmode" conversion which, in contrast to linear regulation, offers the powerful advantage of high efficiency. In this case, the voltage conversion is achieved by switching one or more semiconductor devices rapidly between their "on" (or conducting) state and their "off" (or non-conducting) state such that the appropriate amount of energy is transferred to the load. This principle is called pulse width modulation (PWM). With PWM, the input signal is chopped into pulses, which are averaged to provide a rectified DC voltage used to power the load. PWM is ordinarily realized in converter modules by using a commercially-available PWM integrated circuit (IC) chip. The chip has inputs responsive to the output voltage of the switchmode converter and, based on the detected output voltage, regulates the on and off times of the switching semiconductor device(s) of the converter to thereby regulate the output voltage.

In certain applications, a single power converter module may be required to power loads requiring different, regulated DC voltage levels. Consequently, the power converter modules used to power these various loads typically require a separate PWM chip for each of the required load voltages, which correspondingly increases the cost of the module. Accordingly, there exists a need for less expensive power supply with the capability of supplying multiple DC voltages to a number of loads.

SUMMARY OF THE INVENTION

The present invention is directed to a power supply. According to one embodiment, the power supply includes a regulated switchmode converter, a PWM controller, a semi-regulated switchmode converter, and a linear regulator. The regulated converter is for converting an input voltage to a first output voltage. The PWM controller is responsive to the first output voltage, and includes an output terminal coupled to a control terminal of a switch of the regulated switchmode converter. The semi-regulated switchmode converter is for converting the input voltage to an intermediate output voltage, and includes a switch coupled to the output terminal of the PWM controller. The linear regulator is coupled to the semi-regulated switchmode converter and is for converting the intermediate output voltage to a second output voltage.

According to another embodiment, the power supply additionally includes a second semi-regulated switchmode converter and a second linear regulator. The second semi-regulated switchmode converter is for converting the first output voltage to a second intermediate output voltage, and includes a switch having a control terminal coupled to the output terminal of the PWM controller. The second linear regulator is for converting the second intermediate output voltage to a third output voltage.

According to another embodiment, the power supply includes a regulated switchmode converter, a PWM controller, and a linear switch closed-loop switchmode converter. The regulated switchmode converter is for converting an input voltage to a first output voltage. The PWM controller is responsive to the first output voltage, and includes an output terminal coupled to a control terminal of a switch of the regulated switchmode converter. The linear switch closed-loop switchmode converter is for converting the input voltage to a second output voltage, and includes a switch having a control terminal coupled to the output terminal of the PWM controller.

According to yet another embodiment, the power supply additionally includes a second linear switch closed-loop switchmode converter. The second linear switch closed-loop semi-regulated switchmode converter is for converting the first output voltage to a third output voltage, and includes a switch having a control terminal coupled to the output terminal of the PWM controller.

In contrast to prior art power converter modules, embodiments of the present invention provide a relatively inexpensive power supply with the capability of supplying highly regulated DC voltages to number of loads. In addition, the power supplies of the present invention offer a simple, low risk design featuring a number of standard components. Further, the present invention offers an alternative to using transformers, thereby offering a less complex overall design.

These and other advantages of the present invention will be apparent from the detailed description hereinbelow.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional DC—DC power supply. For example, details regarding the control circuits for controlling the switching of certain control-driven switches of the power converter are not provided herein. Those of ordinary skill in the art will recognize, however, that these and other elements may be desirable in a typical DC—DC power supply. However, because such elements are well known in the art, and because they do not facilitate a better understanding of the present invention, a discussion of such elements is not provided herein.

Figure 1:
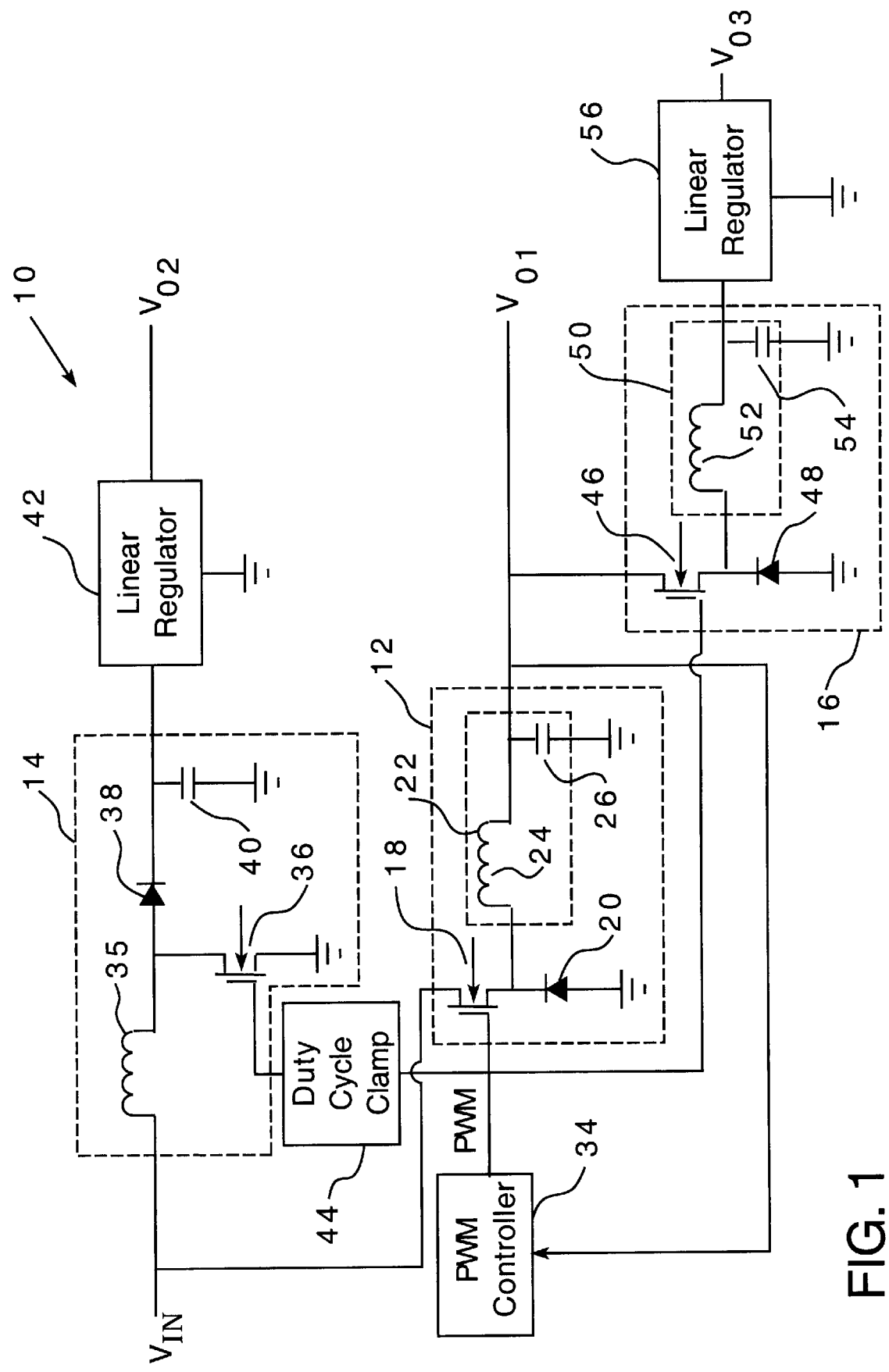
FIG. 1 is a combination block/schematic diagram of a power supply according to one embodiment of the present invention.

FIG. 1 is a diagram of a power supply 10 according to one embodiment of the present invention. The illustrated embodiment include three switchmode converters 12, 14, 16. The first converter 12 may be regulated while the second and third converters 14, 16 may be semi-regulated. That is, as described further hereinbelow, the switching element(s) of the first switchmode converter 12 may be controlled by a pulse width modulated (PWM) control signal whose duty cycle is modulated based on the output voltage of the first switchmode converter ($V_{o1}$), and the switching element(s) of the second and third switchmode converters 14, 16 are responsive to the same PWM control signal, which is, however, independent of the output voltages of the second and third converters ($V_{o2}$, $V_{o3}$). Thus, the second and third converter 14, 16 are referred to herein as being "semi-regulated."

The power supply 10 may receive an input DC voltage $V_{in}$, and the converters 12, 14, 16 may each produce a separate output,DC voltages used to drive various loads (not shown) coupled to the power supply 10. The semi-regulated converters, i.e., the second and third converters 14, 16, may rely on a suitable duty cycle of the PWM control signal to transform their respective input voltages to a suitable region for linear regulation. Although only two semi-regulated converters 14, 16 are illustrated in FIG. 1, other embodiments of the power supply 10 may include only one of the semi-regulated converters 14, 16 or more than two semi-regulated converters.

The first switchmode converter 12 may be, for example, a buck converter, as illustrated in FIG. 1, including a switch 18, a rectifier 20, and an output filter 22 including an inductor 24 and a capacitor 26. The switch 18 may be, for example, a transistor such as an n-channel MOSFET, coupled to the input voltage $V_{in}$. The rectifier 20 may be, for example, a diode as illustrated in FIG. 1, although according to other embodiments the rectifier 20 may be a synchronous rectifier, such as a MOSFET.

The control terminal of the switch 18 may be responsive to a pulse width modulated control signal (PWM) from a PWM controller 34. The PWM controller 34 may be, for example, an integrated circuit (IC) such as, for example, one of the UCC 3800 series of PWM control ICs available from Texas Instruments, Inc. The PWM controller 34 may regulate the duty cycle of the PWM control signal supplied to the switch 18 based on the output voltage of the first converter 12 ($V_{o1}$) to thereby regulate the output voltage of the first converter 12. Accordingly, the first converter 12 may be a regulated converter. The operating principles of buck converters, such as the converter 12, are well known and, therefore, are not further described herein.

The second converter 14 may be, for example, a semi-regulated boost converter including an inductor 35, a switch 36, a rectifier 38 and a capacitor 40. The operating principles of boost converters are well known and, therefore, are not further described herein. The switch 36 may be, for example, a transistor such as an n-channel MOSFET, as illustrated in. FIG. 1. The rectifier 38 may be, for example, a diode, as illustrated in FIG. 1, although according to other embodiments the rectifier 38 may be a synchronous rectifier such as a MOSFET. The output of the second converter 14 may be coupled to a linear regulator 42 to thereby generate a second output voltage ($V_{o2}$) of the power supply 10. The linear regulator 42 is described in more detail hereinbelow. The switch 36 of the second converter 14 may be coupled to the input voltage $V_{in}$ via the inductor 35. The control terminal of the switch 36 may be coupled to the PWM signal of the PWM controller 34 via a duty cycle clamp circuit 44. The third converter 16 may be, for example, a semi-regulated buck converter including a switch 46, a rectifier 48 and an output filter 50 including an inductor 52 and a capacitor 54. The switch 46 may be, for example, a transistor such as an n-channel MOSFET, as illustrated in FIG. 1. The rectifier 48 may be, for example, a diode as illustrated in FIG. 1, although according to other embodiments the rectifier 48 may be a synchronous rectifier, such as a MOSFET. The switch 46 may be coupled to the output voltage of the first converter 12 ($V_{o1}$), and the output of the third converter 16 may be coupled to a second linear regulator 56 to thereby generate a third output voltage ($V_{o3}$) of the power supply 10.

According to one embodiment, the input voltage $V_{in}$, may be fairly regulated in the range 4.5 to 5.5 V. The duty cycle of the PMW control signal from the PWM controller 34 may be regulated between 63% and 73% such that the output voltage of the first converter 12 ($V_{o1}$) is approximately 3.3 V. The third converter 16 may transform the output voltage of the first converter 12 ($V_{o1}$) down to 2.1 to 2.4 V, depending on the duty cycle of the PWM control signal. This is an ideal range for post regulation, and the linear regulator 56, operating with an efficiency of between 80% and 90% (neglecting quiescent currents), may yield an output voltage ($V_{o2}$) of 1.9 V. The second converter 14 may boost the input voltage $V_{in}$ to, for example, 14.2 to 16.7 V, depending upon the input voltage $V_{in}$ and the duty cycle of the of the PWM control signal. The linear regulator 42, operating with an efficiency of approximately 82%, may yield an output voltage ($V_{o3}$) of 12 V. This voltage may also be used, for example, to power the PWM controller 34.

Figure 2:
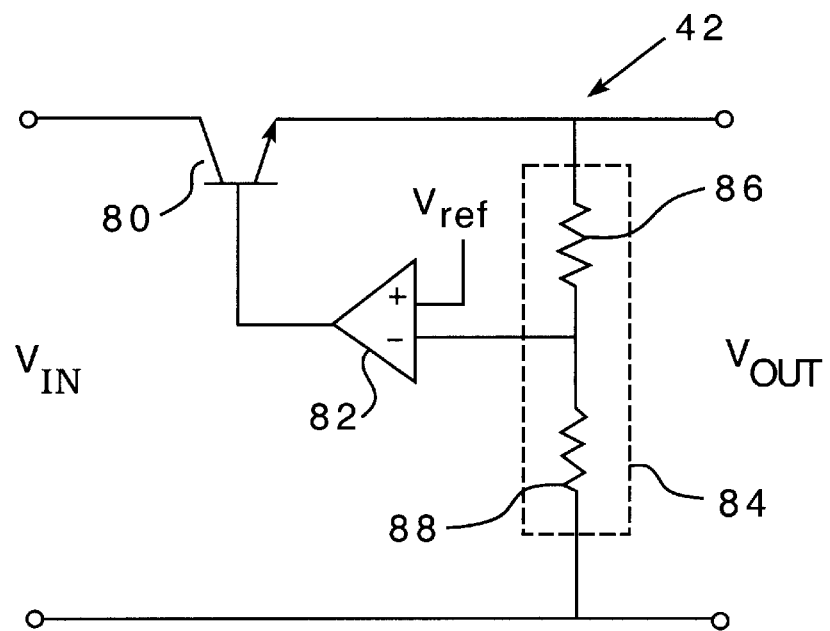
FIG. 2 is a schematic diagram of a linear regulator of the power supply of FIG. 1 according to one embodiment of the present invention.

FIG. 2 is a diagram of the linear regulator 42 according to one embodiment of the present invention. The linear regulator 56 may be similar to the linear regulator 42 illustrated in FIG. 2 and, therefore, will not be described further herein. The linear regulator 42 includes a pass element 80, an operational amplifier (op amp) 82, and a voltage divider circuit 84 including two series-connected resistors 86, 88. The pass element 80 may be a switch such as, for example, an NPN transistor as illustrated in FIG. 2. The input voltage $V_{in}$ to the linear regulator 42 may be across the capacitor 40 of the second converter 14, and the output voltage $V_{out}$ may be the third output voltage ($V_{o3}$) of the power supply 10.

In the illustrated embodiment, a negative feedback loop is used to regulate the output voltage $V_{out}$ at the desired value by means of selecting the values of the resistors 86, 88 of the voltage divider circuit 84. The control terminal of the pass element 80 is driven by the op amp 82 to maintain $V_{out}$ at the desired value, such as 12 V. It should be noted that the entire output current of the linear regulator 42 is continuously conducted by the pass element 80. Consequently, the voltage drop across the pass element 80 corresponds to $V_{in}-V_{out}$. According to other embodiments of the present invention, different topologies for the linear regulators 42, 56 may be used.

Figure 3:
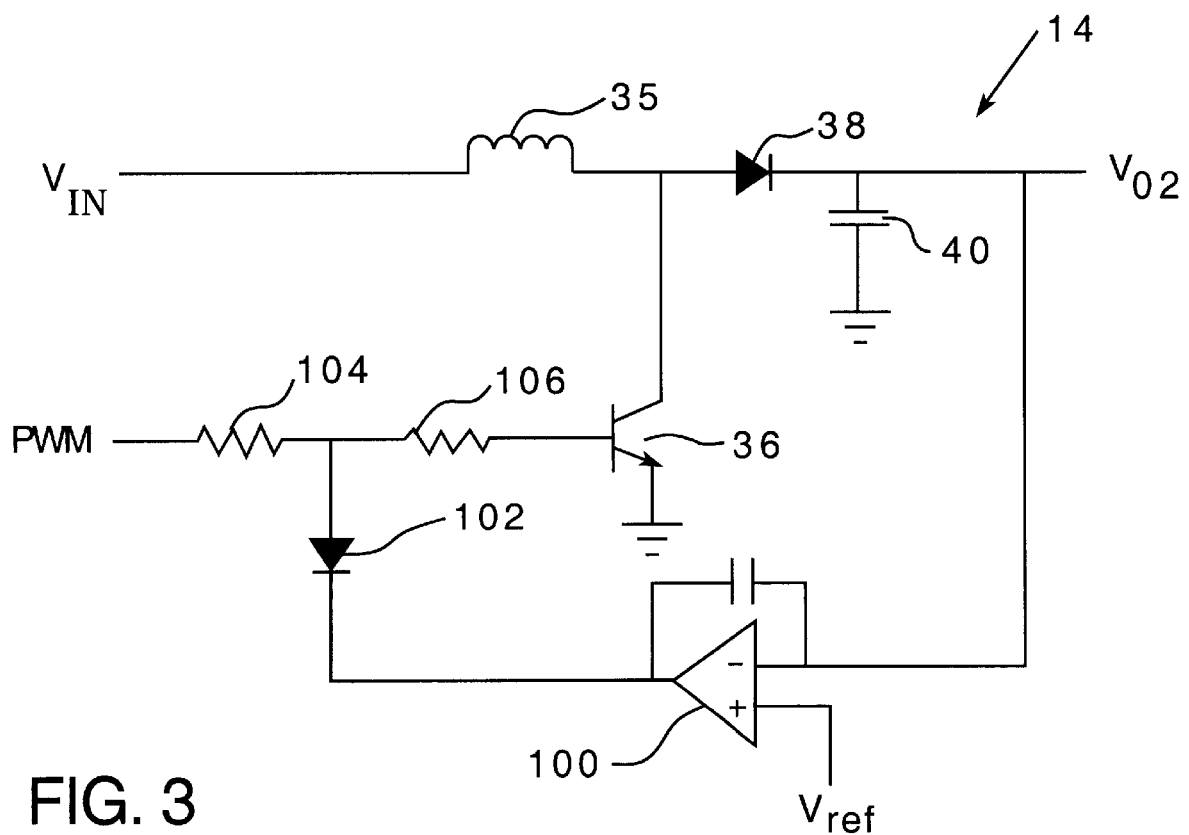
FIG. 3 is a schematic diagram of the second converter of the power supply of FIG. 1 according to one embodiment of the present invention.

FIG. 3 is a diagram of the second converter 14 according to another embodiment of the present invention. The converter 14 illustrated in FIG. 3 is similar to that of FIG. 1, except that the switch 36 is depicted as an NPN transistor. In addition, the converter 14 includes an op amp 100 configured to provide a local feedback loop. Accordingly, the converter 14 of FIG. 3 utilizes what is referred to herein as a linear switch closed-loop" topology. The op amp 100 includes a first input terminal (e.g., an inverting input terminal) responsive to the output voltage of the converter 14, a second input terminal (e.g., a non-inverting input terminal) responsive to a reference voltage Vref, and an output terminal coupled to the input terminal of the switch 36 via a reverse-biased diode 102. The control terminal of the switch 36 is also responsive to the PWM control signal (via the duty cycle clamp 44, see FIG. 1) via a pair of resistors 104, 106. The topology provides a semi-regulated voltage generated by an open-loop method, which is then closed-loop regulated. The semi-regulation (open-loop) and closed-loop regulation are performed in the same pass element, i.e., the switch 36. Therefore, this topology. is referred to as a "linear switch closed-loop" topology.

According to such an embodiment, the switch 36 is fully turned off when the PWM control signal is low, but the degree to which the switch 36 is switched on may depend on the difference between the actual output voltage and the desired output voltage (based on the value of the resistors 104, 106 and Vref). Thus, the switch 36 may operate to some extent in the linear mode, thereby increasing power dissipation. Consequently, if the duty of the PWM control signal is of sufficient duration to produce an output voltage greater than desired, the PWM control signal may then be fine tuned to achieve the desired output voltage. Accordingly, by effectively starving current from the control terminal of the switch 36 by an amplitude modulation technique, the desired second output voltage $V_{o2}$ may be realized with the converter 14 of FIG. 3 without the need for the linear regulator 42. Moreover, despite the introduction of inefficiencies of this configuration, it may still be more efficient than an efficient switchmode converter followed by a linear regulator, as shown in the embodiment of FIG. 1.

Figure 4:
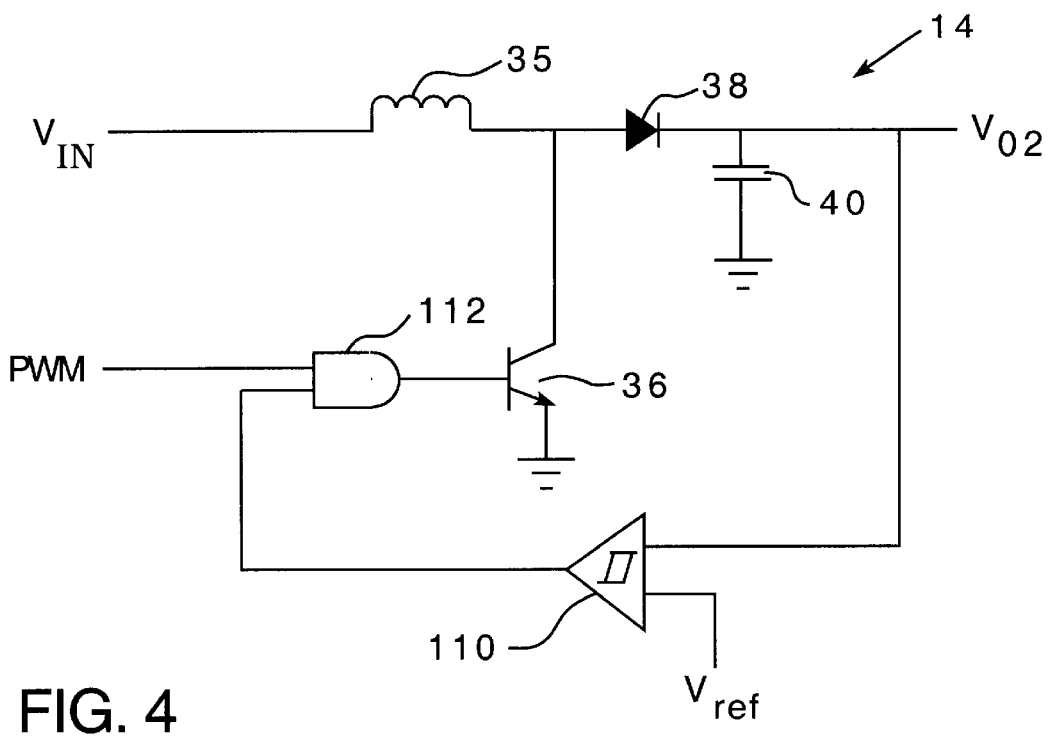
FIG. 4 is a schematic diagram of the second converter of the power supply of FIG. 1 according to one embodiment of the present invention.

FIG. 4 is a diagram of converter 14 according to another embodiment of the present invention. The converter 14 of FIG. 4 is a linear switch closed-loop converter similar to that of FIG. 3, except that it includes a comparator 110 and a logic gate 112. The comparator 110 is responsive to the output voltage of the converter 14 ($V_{o2}$) and a reference voltage Vref. The logic gate 112 may be, for example, an AND gate having a first input terminal responsive to the PWM control signal, a second input terminal responsive to the output terminal of the comparator 110, and an output terminal coupled to the control terminal of the switch 36. According to such an embodiment, the switch 36 may be digitally regulated to provide a post-modulation technique, in contrast to the amplitude modulation technique of FIG. 3. Using such a post-modulation technique, the switching of the switch 36 may be controlled to provide the desired second output voltage $V_{o2}$ of the power supply 10 without the need for the linear regulator 42.

Figure 5:
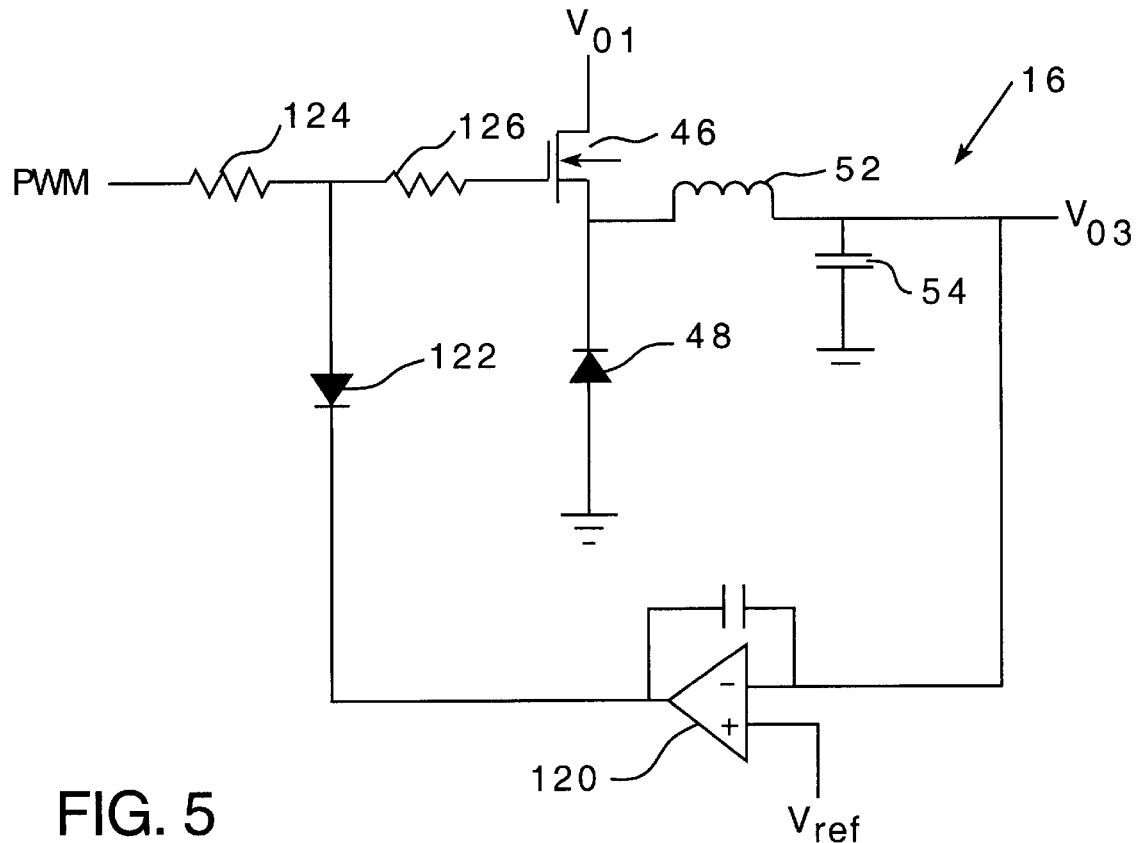
FIG. 5 is a schematic diagram of the third converter of the power supply of FIG. 1 according to one embodiment of the present invention.

The amplitude and post modulation techniques described may also be used in conjunction with the third converter 16. FIG. 5 is a diagram of the third converter 16 according to an embodiment using the amplitude modulation technique to regulate the output voltage ($V_{o3}$). Like the converter 14 illustrated in FIG. 3, the converter 16 illustrated in FIG. 5 includes an op amp 120 to provide a local feedback loop. The op amp 120 has an inverting input terminal responsive to the output voltage ($V_{o3}$) of the converter 16 and a non-inverting input terminal responsive to a reference voltage (Vref). The output terminal of the op amp 120 is coupled to the control terminal of the switch 46 via reverse-biased diode 122. The PWM control signal from. the PWM controller may be coupled to the control terminal of the switch 46 via a pair of resistors 124, 126. The feedback loop of the converter 16 may operate in a similar manner as the converter 14 of FIG. 3 in realizing the desired output voltage.

Figure 6:
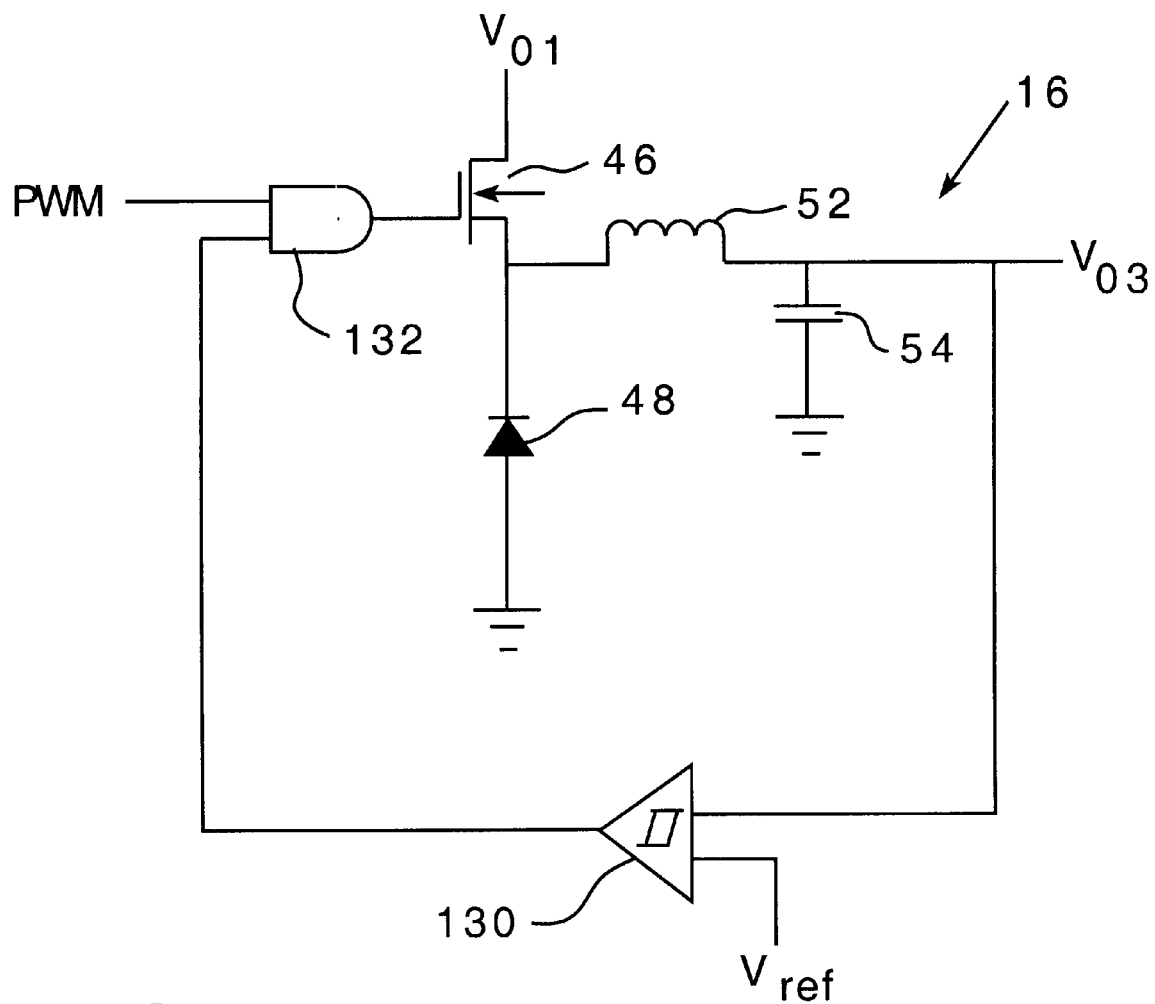
FIG. 6 is a schematic diagram of the third converter of the power supply of FIG. 1 according to one embodiment of the present invention.

FIG. 6 is a diagram of the converter 16 according to another embodiment of the present. invention using the post modulation technique to regulate the output voltage ($V_{o3}$). Like the converter 14 of FIG. 4, the converter 16 of FIG. 6 includes a comparator 130 and a logic gate 132. The, logic gate 132 may be, for example, an AND gate. A first input terminal of the comparator 130 may be responsive to the output voltage ($V_{o3}$) and a second input terminal may be responsive to a reference voltage. The output terminal of the comparator 130 may be coupled to an input terminal of the logic gate 132. The second input terminal of the logic gate 132 may be responsive to the PWM control signal from the PWM controller 34, and the output terminal of the logic gate 132 may be coupled to the control terminal of the switch 46. The feedback loop of the converter 16 of FIG. 6 may operate in a similar manner as the converter 14 of FIG. 4 in realizing the desired output voltage.

Figure 7:
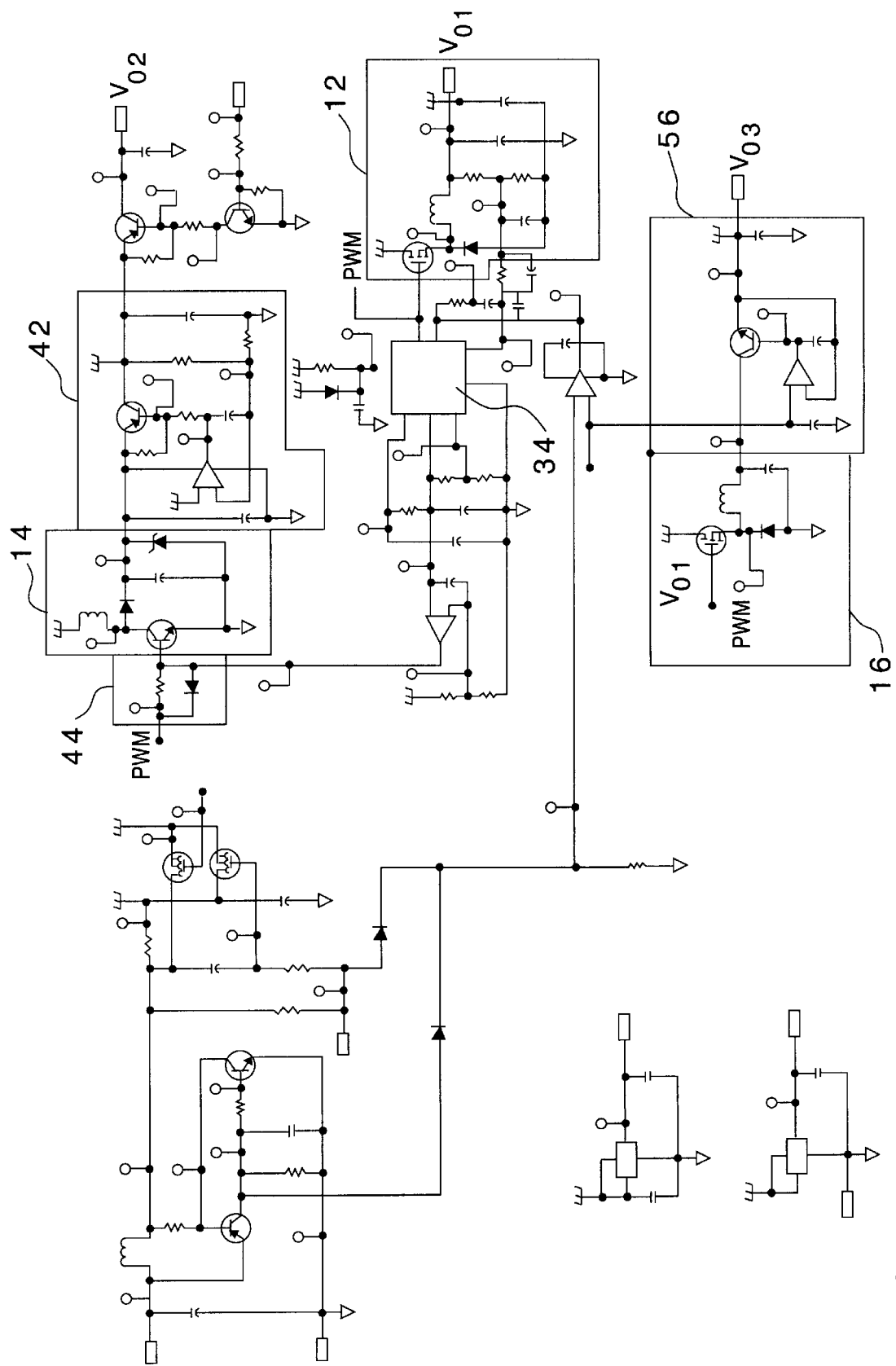
FIG. 7 is a schematic diagram of a power supply according to another embodiment of the present invention.

FIG. 7 is a more detailed schematic diagram of the power supply 10 according to one embodiment of the present invention. The illustrated power supply 10 includes circuit embodiments for the first, second and third converters 12, 14, 16, the linear regulators 42, 56, and the duty cycle clamp 44.

Figure 8:
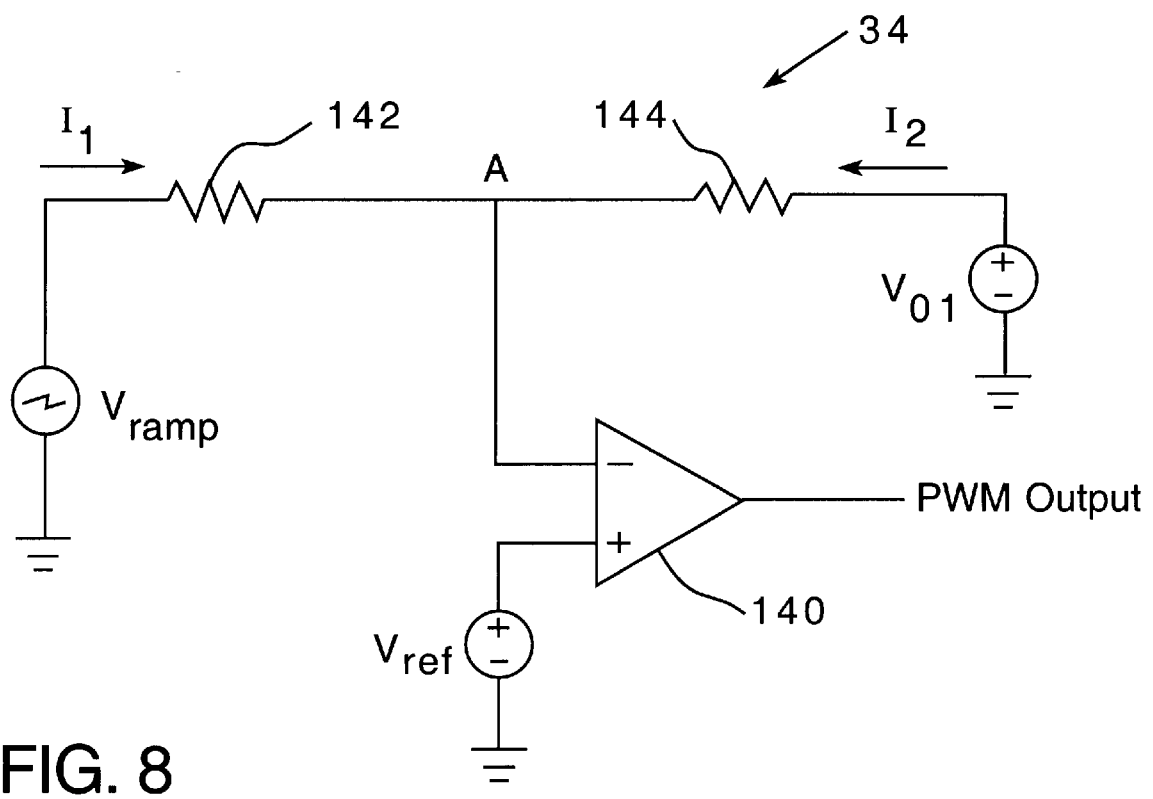
FIG. 8 is a schematic diagram of the PWM controller of FIG. 1 according to one embodiment of the present invention.

FIG. 8 is a diagram of the PWM controller 34 according to one embodiment of the present invention. The illustrated embodiment includes a comparator 140 such as, for example, LM393 comparator, and a pair of resistors 142, 144. A reference voltage (Vref) is supplied to the non-inverting terminal of the comparator 142, and a sum of a sample of the output voltage $V_{o1}$ and a time dependent (ramp) signal is supplied to the inverting terminal. The output voltage sample and the ramp voltage signal are coupled to a node A for summation via the resistors 142, 144 respectively as illustrated in FIG. 8. The voltage at node A ($V_A$) thus corresponds to:

$$V_A = \frac{R_{144} \cdot V_{ramp} + R_{142} \cdot V_{o1}}{R_{142} + R_{144}} \quad (1)$$

The slope of this voltage ($V_A$), which is a function of time (from $V_{ramp}$), may be varied depending on the relationship of $R_{142}$ to $R_{144}$. Changing the slope effectively results in changing the gain of the system, assuming the voltage sources $V_{ramp}$ and $V_{o1}$ have negligible internal impedance compared to both $R_{142}$ and $R_{144}$. The PWM controller 34 of FIG. 8 thus offers a relatively cheap and easy implementation because no mixed signal fabrication in necessary. In addition, the PWM controller 34 of FIG. 8 offers a more predictable and repeatable design because the feedback loop in non-reactive, and thus frequency independent.

Although the present invention has been described herein with respect to certain embodiments, those of ordinary skill in the art will recognize that many modifications and variations of the present invention may be implemented. The foregoing description and the following claims are intended to cover all such modifications and variations.

What is claimed is:

1. A power supply, comprising:
   a regulated switchmode converter for converting an input voltage to a first output voltage;
   a PWM controller responsive to the first output voltage, wherein the PWM controller includes an output terminal coupled to a control terminal of a switch of the regulated switchmode converter;
   a first semi-regulated switchmode converter for converting the input voltage to an intermediate output voltage, wherein the output terminal of the PWM controller is coupled to a control terminal of a switch of the first semi-regulated switchmode converter; and
   a first linear regulator coupled to the first semi-regulated switchmode converter for converting the intermediate output voltage to a second output voltage.

2. The power supply of claim 1, further comprising a duty cycle clamp circuit coupled between the output terminal of the PWM controller and the control terminal of the switch of the first semi-regulated switchmode converter.

3. The power supply of claim 2, wherein:
   the regulated switchmode converter includes a buck converter; and
   the first semi-regulated switchmode converter includes a boost converter.

4. The power supply of claim 2, further comprising:
   a second semi-regulated switchmode converter for converting the first output voltage to a second intermediate output voltage, wherein the second semi-regulated switchmode converter includes a switch having a control terminal coupled to the output terminal of the PWM controller; and
   a second linear regulator coupled to the second semi-regulated switchmode converter for converting the second intermediate output voltage to a third output voltage.

5. The power supply of claim 4, wherein:
   the regulated switchmode converter includes a buck converter;
   the first semi-regulated switchode converter includes a boost converter; and
   the second semi-regulated switchmode converter includes a buck converter.

6. The power supply of claim 1, wherein the PWM controller includes a comparator having an inverting terminal responsive to a sum of the first output voltage and a time dependent voltage, a non-inverting terminal responsive to a reference voltage, and an output terminal coupled to the control terminal of the switch of the regulated switchmode converter.

7. A power supply, comprising:
   a regulated switchmode converter for converting an input voltage to a first output voltage;
   a PWM controller responsive to the first output voltage, wherein the PWM controller includes an output terminal coupled to a control terminal of a switch of the regulated switchmode converter;
   a semi-regulated switchmode converter for converting the first output voltage to an intermediate output voltage, wherein the semi-regulated switchmode converter includes a switch having a control terminal coupled to the output terminal of the PWM controller; and
   a linear regulator coupled to the semi-regulated switchmode converter for converting the intermediate output voltage to a second output voltage.

8. The power supply of claim 7, wherein:
   the regulated switchmode converter includes a buck converter; and
   the semi-regulated switchmode converter includes a buck converter.

9. The power supply of claim 7, wherein the PWM controller includes a comparator having an inverting terminal responsive to a sum of the first output voltage and a time dependent voltage, a non-inverting terminal responsive to a reference voltage, and an output terminal coupled to the control terminal of the switch of the regulated switchmode converter.

10. A power supply, comprising:
    a regulated switchmode converter for converting an input voltage to a first output voltage;
    a PWM controller responsive to the first output voltage, wherein the PWM controller includes an output terminal coupled to a control terminal of a switch of the regulated switchmode converter; and
    a first linear switch closed-loop switchmode converter for converting the input voltage to a second output voltage, wherein the first linear switch closed-loop switchmode converter includes a switch having a control terminal coupled to the output terminal of the PWM controller.

11. The power supply of claim 10, wherein the first linear switch closed-loop switchmode converter includes an operational amplifier having an input terminal responsive to the second output voltage and an output terminal coupled to the control terminal of the switch of the first linear switch closed-loop switchmode converter.

12. The power supply of claim 10, wherein the first linear switch closed-loop switchmode converter includes:
    a comparator having an input terminal responsive to the second output voltage and having an output terminal; and
    a logic gate having a first input terminal coupled to the output terminal of the PWM controller, a second input terminal coupled to the output terminal of the comparator, and an output terminal coupled to the control terminal of the switch of the first linear switch closed-loop switchmode converter.

13. The power supply of claim 10, further comprising a second linear switch closed-loop switchmode converter for converting the first output voltage to a second output voltage, wherein the second linear switch closed-loop switchmode converter includes a switch having a control terminal coupled to the output terminal of the PWM controller.

14. The power supply of claim 10, further comprising:
a second semi-regulated switchmode converter for converting the first output voltage to an intermediate output voltage, wherein the second semi-regulated switchmode converter includes a switch having a control terminal coupled to the output terminal of the PWM controller; and
a linear regulator coupled to the second semi-regulated switchmode converter for converting the intermediate output voltage to a third output voltage.

15. The power supply of claim 10, wherein the PWM controller includes a comparator having an inverting terminal responsive to a sum of the first output voltage and a time dependent voltage, a non-inverting terminal responsive to a reference voltage, and an output terminal coupled to the control terminal of the switch of the regulated switchmode converter.

16. A power supply, comprising:
a regulated switchmode converter for converting an input voltage to a first output voltage;
a PWM controller responsive to the first output voltage, wherein the PWM controller includes an output terminal coupled to a control terminal of a switch of the regulated switchmode converter; and
a first linear switch closed-loop switchmode converter for converting the first output voltage to a second output voltage, wherein the first linear switch closed-loop converter includes a switch having a control terminal coupled to the output terminal of the PWM controller.

17. The power supply of claim 16, wherein the first linear switch closed-loop switchmode converter includes an operational amplifier having an input terminal responsive to the second output voltage and an output terminal coupled to the control terminal of the switch of the first linear switch closed-loop switchmode converter.

18. The power supply of claim 16, wherein the first linear switch closed-loop switchmode converter includes:
a comparator having an input terminal responsive to the second output voltage and having an output terminal; and
a logic gate having a first input terminal coupled to the output terminal of the PWM controller, a second input terminal coupled to the output terminal of the comparator, and an output terminal coupled to the control terminal of the switch of the first linear switch closed-loop switchmode converter.

19. The power supply of claim 16, further comprising:
a second semi-regulated switchmode converter for converting the input output voltage to an intermediate output voltage, wherein the second semi-regulated switchmode converter includes a switch having a control terminal coupled to the output terminal of the PWM controller; and
a linear regulator coupled to the second semi-regulated switchmode converter for converting the intermediate output voltage to a third output voltage.

20. The power supply of claim 16, wherein the PWM controller includes a comparator having an inverting terminal responsive to a sum of the first output voltage and a time dependent voltage, a non-inverting terminal responsive to a reference voltage, and an output terminal coupled to the control terminal of the switch of the regulated switchmode converter.

21. A method of converting an input voltage to multiple output voltages, comprising:
converting the input voltage to first output voltage with a regulated switchmode converter;
converting the input voltage to a first intermediate output voltage with a semi-regulated switchmode converter; and
converting the first intermediate voltage to a second output voltage with a first linear regulator.

22. The method of claim 21, further comprising:
converting the first output voltage to a second intermediate output voltage with a second semi-regulated switchmode converter; and
converting the second intermediate output voltage to a third output voltage with a second linear regulator.

23. A method of converting an input voltage to multiple output voltages, comprising:
converting the input voltage to first output voltage with a regulated switchmode converter;
converting the first output voltage to an intermediate output voltage with a semi-regulated switchmode converter; and
converting the intermediate output voltage to a second output voltage with a linear regulator.

24. A method of converting an input voltage to multiple output voltages, comprising:
converting the input voltage to first output voltage with a regulated switchmode converter; and
converting the input voltage to a second output voltage with a first linear switch closed-loop switchmode converter.

25. The method of claim 24, further comprising converting the first output voltage to a third output voltage with a second linear switch closed-loop switchmode converter.

26. The method of claim 24, further comprising:
converting the first output voltage to an intermediate output voltage with a second semi-regulated switchmode converter; and
converting the intermediate output voltage to a second output voltage with a linear regulator.

27. A method of converting an input voltage to multiple output voltages, comprising:
converting the input voltage to first output voltage with a regulated switchmode converter; and
converting the first output voltage to a second output voltage with a first linear switch closed-loop switchmode converter.

28. The method of claim 27, further comprising:
converting the input voltage to an intermediate output voltage with a second semi-regulated switchmode converter; and
converting the intermediate voltage to a second output voltage with a first linear regulator.

* * * * *

UNITED STATES PATENT AND TRADEMARK OFFICE
CERTIFICATE OF CORRECTION

PATENT NO.    : 6,469,478 B1
DATED         : October 22, 2002
INVENTOR(S)   : John C. Curtin It is certified that error appears in the above-identified patent and that said Letters Patent is hereby corrected as shown below:

Colunm 3,
Line 51, delete the comma between "output,DC"
Line 51, add -- ($V_{01}$, $V_{02}$ and $V_{03}$ respectively), which may be --

Column 4,
Line 46, add -- of -- between "range 4.5"

Colunm 6,
Line 33, delete the period between "present. invention"
Line 36, delete the comma between "The, logic"
Line 59, add -- an -- before "LM393"

Signed and Sealed this

Nineteenth Day of August, 2003

JAMES E. ROGAN
*Director of the United States Patent and Trademark Office*